(12) United States Patent
Oberender et al.

(10) Patent No.: US 9,989,119 B2
(45) Date of Patent: Jun. 5, 2018

(54) PISTON-CYLINDER UNIT

(71) Applicants: Mike Oberender, Nickenich (DE); Martin Millnski, Gierschnach (DE); Emanuele Roncaroli, Cermusco sul Naviglio (IT); Vladimir Friesen, Andernach (DE)

(72) Inventors: Mike Oberender, Nickenich (DE); Martin Millnski, Gierschnach (DE); Emanuele Roncaroli, Cermusco sul Naviglio (IT); Vladimir Friesen, Andernach (DE)

(73) Assignee: Stabilus GmbH, Koblenz (DE)

( * ) Notice: Subject to any disclaimer, the term of this patent is extended or adjusted under 35 U.S.C. 154(b) by 360 days.

(21) Appl. No.: 14/729,968

(22) Filed: Jun. 3, 2015

(65) Prior Publication Data
US 2016/0115975 A1 Apr. 28, 2016

(30) Foreign Application Priority Data

Oct. 25, 2014 (DE) .......................... 10 2014 115 543

(51) Int. Cl.
| | | |
|---|---|---|
| *F15B 15/14* | (2006.01) | |
| *F16F 9/02* | (2006.01) | |
| *F16F 9/38* | (2006.01) | |

(52) U.S. Cl.
CPC .............. *F16F 9/0218* (2013.01); *F16F 9/38* (2013.01)

(58) Field of Classification Search
CPC .................................. F16F 9/0218; F16F 9/38

USPC .......... 91/117 A; 16/71, 49, 51, 66; D15/23, D15/25
See application file for complete search history.

(56) References Cited

U.S. PATENT DOCUMENTS

| | | | | |
|---|---|---|---|---|
| 1,731,561 | A  * | 10/1929 | Campbell ............. | E05F 1/1253 16/50 |
| 5,743,503 | A  * | 4/1998 | Voeller ................... | F16M 11/08 248/284.1 |
| 6,164,096 | A  * | 12/2000 | Lai ........................ | E05B 37/025 70/25 |
| 6,460,666 | B1 * | 10/2002 | Wach .................... | F16F 9/0209 188/322.17 |
| 6,600,285 | B2 | 7/2003 | Mintgen et al. | |
| 7,146,766 | B2 * | 12/2006 | Finkelstein ........... | E05F 1/1091 16/84 |
| 8,251,354 | B2 * | 8/2012 | Asa ....................... | F16F 9/0218 188/322.12 |

(Continued)

FOREIGN PATENT DOCUMENTS

| | | |
|---|---|---|
| CN | 2 937 642 | 8/2007 |
| DE | 11 42 472 | 1/1963 |

(Continued)

*Primary Examiner* — Michael Leslie
*Assistant Examiner* — Richard Drake
(74) *Attorney, Agent, or Firm* — Cozen O'Connor

(57) ABSTRACT

A piston-cylinder unit having a cylinder, the interior of the cylinder being divided into two working chambers by a displaceable piston, a piston rod being arranged at the piston and guided outward in a sealed manner through one of the working chambers. A first connection end is arranged at the end of the cylinder opposite the piston rod and a second connection end is arranged at the free end of the piston rod. The cylinder is enclosed by a first housing which is fastened by its one end region to the first connection end.

8 Claims, 3 Drawing Sheets

(56) References Cited

U.S. PATENT DOCUMENTS

| | | | |
|---|---|---|---|
| 8,689,953 B2 * | 4/2014 | Bauman | F16F 9/38 188/322.12 |
| 8,959,710 B2 * | 2/2015 | Wach | E05F 5/02 16/49 |
| 9,126,723 B2 * | 9/2015 | Messerschmidt | B65D 25/22 |
| 9,360,077 B2 * | 6/2016 | Bochen | F16F 9/54 |
| 2001/0035725 A1 | 11/2001 | Mintgen et al. | |
| 2003/0050426 A1 | 3/2003 | Shastri | |
| 2009/0097908 A1 * | 4/2009 | Asa | F16C 7/04 403/122 |
| 2010/0024159 A1 * | 2/2010 | Oh | E05D 5/0246 16/54 |

FOREIGN PATENT DOCUMENTS

| | | |
|---|---|---|
| DE | 101 10 884 | 10/2001 |
| DE | 10 2006 001 305 | 4/2007 |
| DE | 20 2006 006 021 | 10/2007 |
| DE | 10 2007 011 325 | 9/2008 |
| DE | 10 2008 020 543 | 10/2009 |
| JP | H05-106675 | 4/1993 |

* cited by examiner

PISTON-CYLINDER UNIT

BACKGROUND OF THE INVENTION

1. Field of the Invention

The invention is directed to a piston-cylinder unit having a cylinder, the interior of the cylinder being divided into two working chambers by a displaceable piston, a piston rod being arranged at the piston and guided outward in a sealed manner through one of the working chambers, a first connection end is arranged at the end of the cylinder opposite the piston rod, and a second connection end is arranged at the free end of the piston rod.

2. Description of the Related Art

When piston-cylinder units of this type are used for the adjustment of elements in an environment where their physical appearance is unsuited, an unpleasant impression is made. This is the case, for example, when these adjustable elements are parts of furniture such as cabinet shutters.

SUMMARY OF THE INVENTION

It is an object of one embodiment of the invention to provide a piston-cylinder unit that has a visually attractive visible exterior and is easy to assemble.

According to one embodiment of the invention, the cylinder is enclosed by a first housing fastened by its one end region to the first connection end.

In one embodiment of the invention the second connection end is enclosed by a second housing fastened to the second connection end.

The piston-cylinder unit can be a damper or a gas spring.

A fastening of the first housing and/or second housing is carried out in each instance at only one location so that length tolerances of the cylinder or of the fastening region of the piston rod do not have a negative influence and cannot impede easy assembly.

The first housing and/or the second housing are/is preferably formed as plastic injection molded parts.

The first housing can be connected to the first connection end and/or the second housing can be connected to the second connection end by positive engagement, and the positive engagement connection is preferably carried out with slight play so that manufacturing tolerances of the connection ends do not impede easy assembly.

Because of the positive engagement connection, standard piston-cylinder units can be used without needing to make modifications to them.

The first connection end can be enclosed by the first housing while leaving a first connection opening and/or the second connection end can be enclosed by the second housing while leaving a second connection opening.

Simple assembly is made possible in that the first housing and/or the second housing are/is formed of a plurality of housing parts, and the housing parts can be connected to one another by connection elements.

This assembly is further facilitated when the connection elements are snap elements arranged at one or more first housing parts and which can be snapped into corresponding snap recesses at one or more second housing parts.

When the snap elements are formed integrally with the housing parts, a reduction of component parts and a simplification of logistics are achieved.

Two first housing parts and two second housing parts can be arranged opposite one another in each instance.

When one or more of the first housing parts and/or second housing parts have supporting webs protruding at their side facing the cylinder or facing the first connection end and/or second connection end, the housing parts can have a contour that is independent of the contours of the cylinder and/or of the second connection end without the cylinder and/or second connection end being arranged in the housings with greater play, which could lead to annoying rattling noises when the piston-cylinder unit is actuated.

When the first housing engages around the front wall of the cylinder on the piston rod side to leave a through-opening for the piston rod and/or when the second housing engages around the front wall of the second connection end facing the cylinder to leave a second through-opening for the piston rod, the only visible structural component having a technical function is the piston rod, while the cylinder and the connection ends are encased for a visually pleasing visible exterior.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
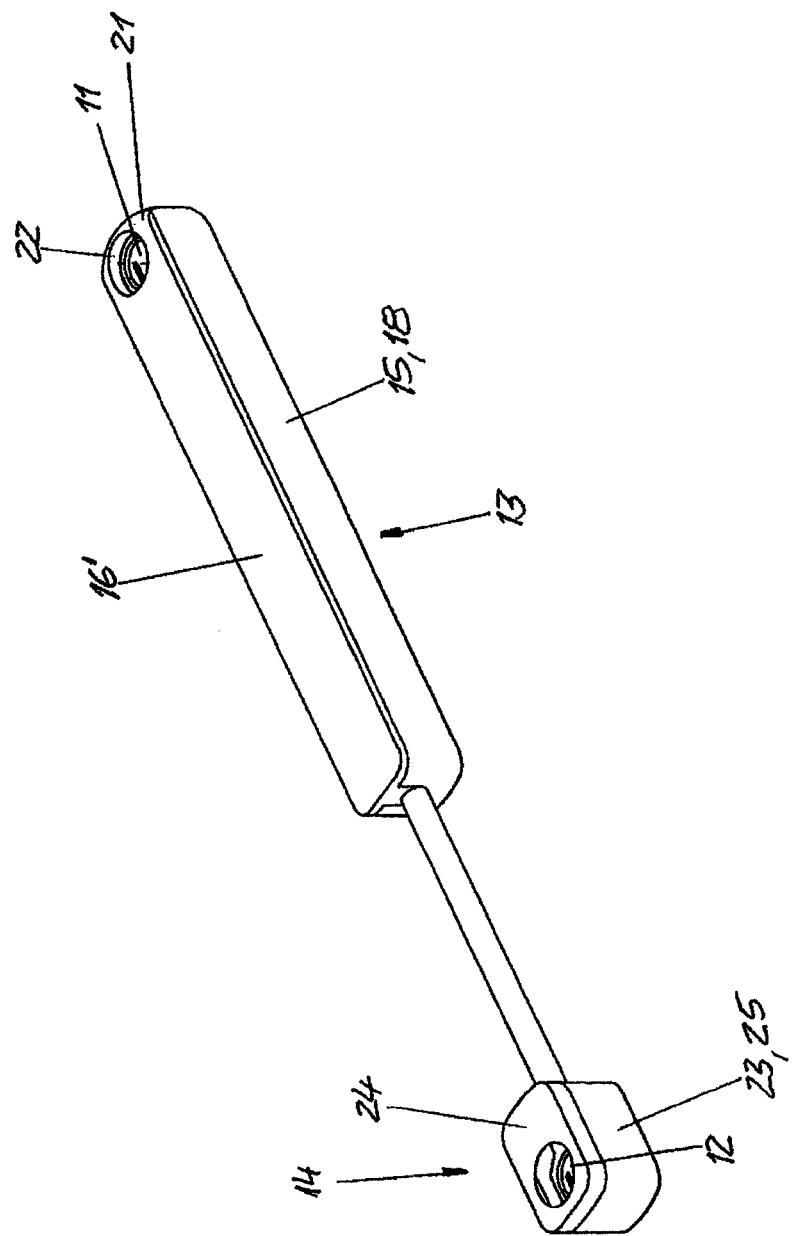
FIG. 1 is a perspective view of a piston-cylinder unit.
Figure 2:
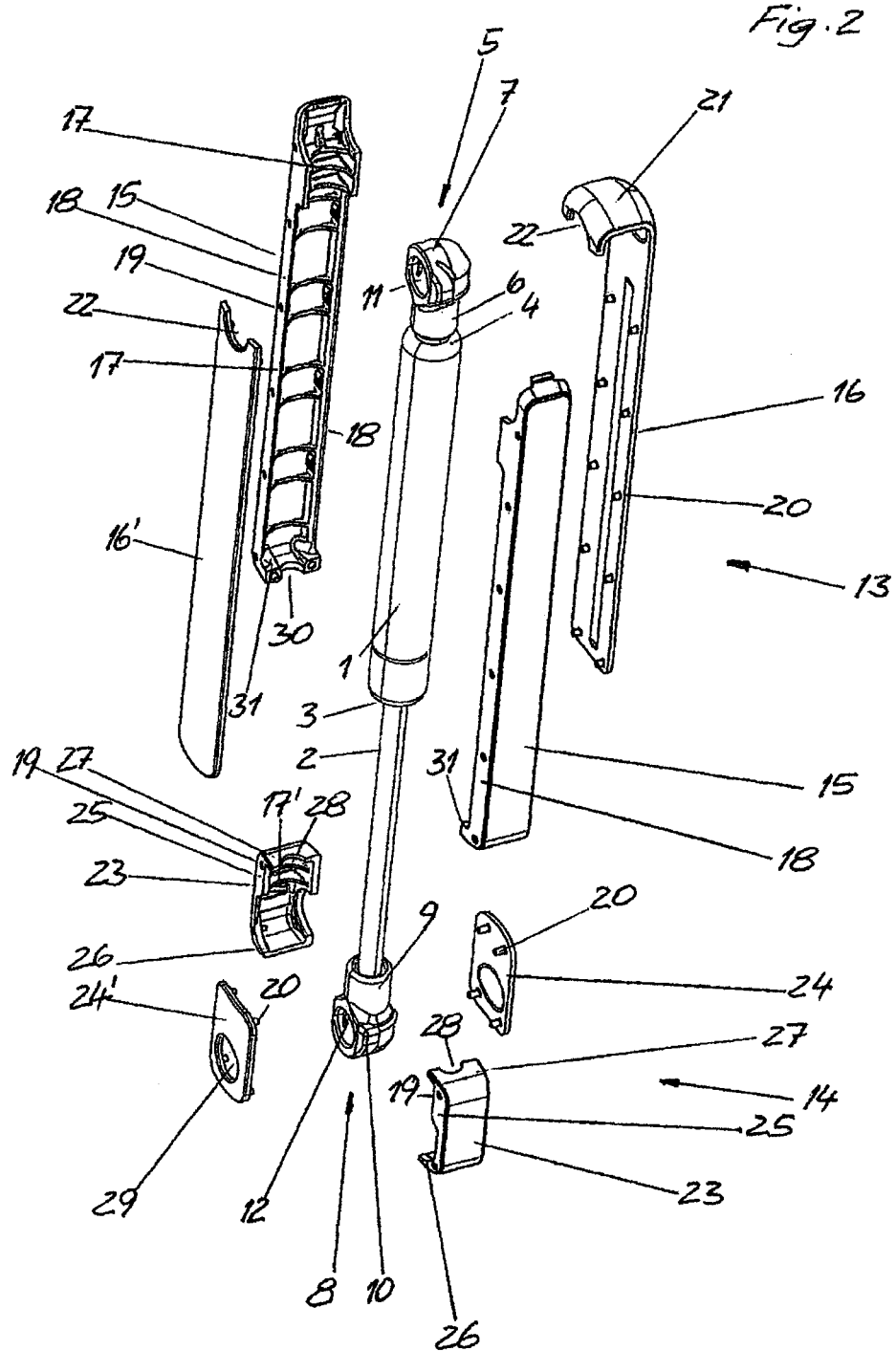
FIG. 2 is an exploded view of the piston-cylinder unit according to FIG. 1 with the constructional unit comprising cylinder, piston rod, and connection ends.
Figure 3:
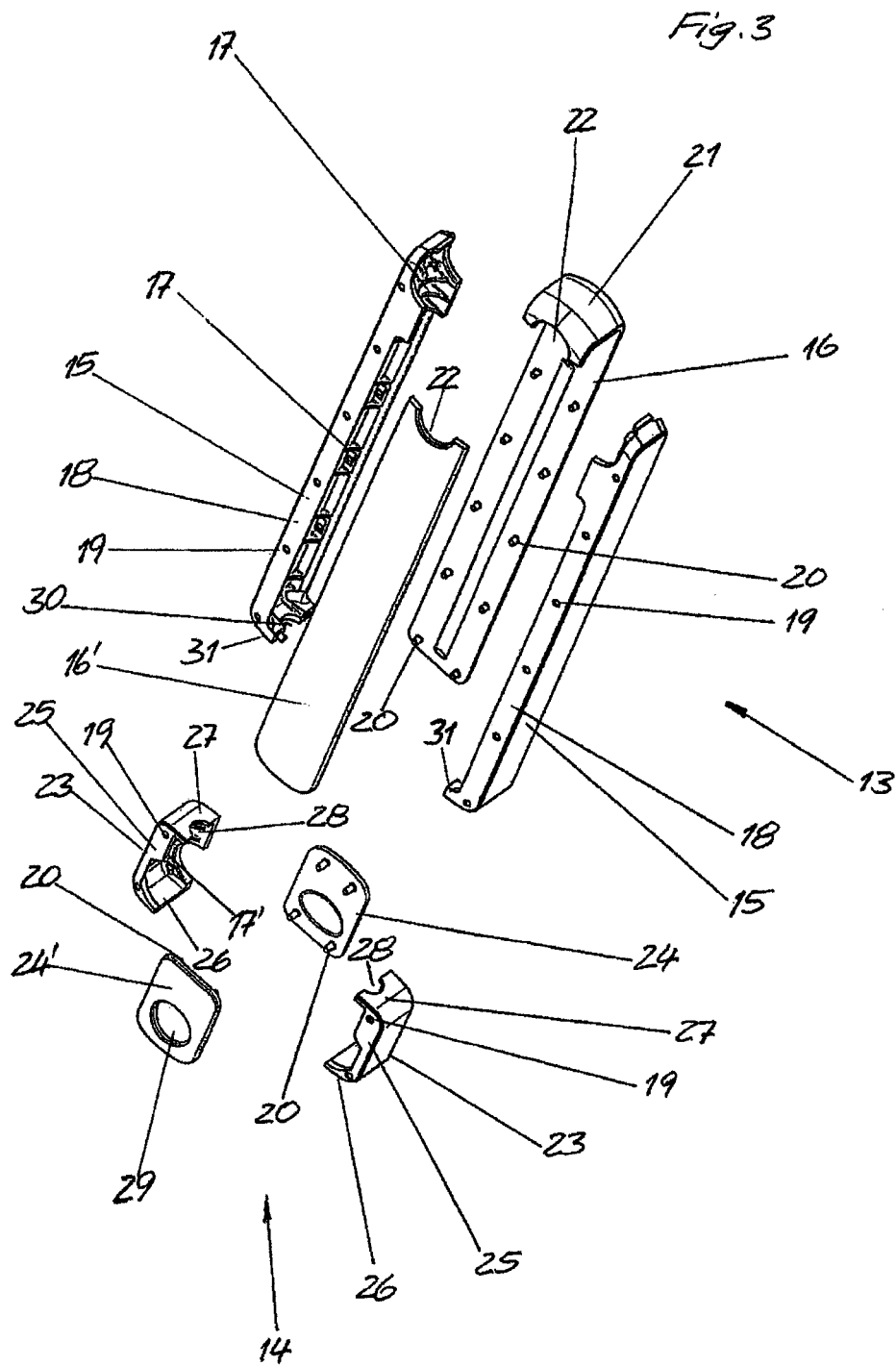
FIG. 3 is an exploded view of the piston-cylinder unit according to FIG. 1 without the constructional unit comprising cylinder, piston rod, and connection ends.

The depicted piston-cylinder unit has a cylinder 1, shown in FIG. 2, in which a piston, not visible, is arranged so as to be displaceable, which piston divides the interior of the cylinder 1 into two working chambers. Arranged at the piston is a piston rod 2, which is guided outward through one of the working chambers and in a sealed manner through a through-opening in the front wall 3 of cylinder 1, which front wall 3 bounds this working chamber.

The end of the cylinder 1 remote of the piston rod 2 is closed by a second front wall 4 at which a first connection end 5 is arranged coaxially. The first connection end 5 has a first connection stud 6 connected by its one end to the second front wall 4 and which has at its other end a first ball head socket 7, which has a greater radial extension than the first connection stud 6.

A second connection end 8 is arranged at the free end of the piston rod 2. The second connection end 8 has a second connection stud 9 connected by its one end to the free end of the piston rod 2 and carries at its other end a second ball head socket 10, which has a greater radial extension than the second connection stud 9.

The first ball head socket 7 has a first connection opening 11 that is directed transverse to the longitudinal extension of the cylinder 1, and the second ball head socket 10 has a second connection opening 12 that is directed transverse to the longitudinal extension of the cylinder 1.

The cylinder 1 and the first connection end 5 are enclosed by a first housing 13 and the second connection end 8 is enclosed by a second housing 14. The first housing 13 and second housing 14 are formed as injection molded plastic parts.

The first housing 13 is formed of two identical opposing first housing parts 15 and two opposing second housing parts 16, 16'.

The first housing parts 15 are formed as open boxes and have at their mutually facing inner sides supporting webs 17 arranged so as to be spaced apart from one another along the longitudinal extension. The supporting webs extends traverse to the longitudinal extension. The supporting webs 17 abut by their front sides at the cylinder 1 in the region of the cylinder 1 when the first housing 13 is assembled. In the region of the first connection end 5, the front sides of the supporting webs 17 conform to the contour of the first connection stud 6 and to the contour of the first ball head socket 7.

A plurality of snap recesses 19 are formed at the two side walls 18 of the first housing parts 15 and are spaced apart from one another in longitudinal extension thereof.

The ends of the two front walls 31 of the first housing parts 15, which front walls 31 are remote of the first connection end 5, abut one another in the assembled condition such that their separating line intersects the piston rod 2 in the center. These two parts have at these abutting ends, respectively, one half of a through-opening 30 through which the piston rod 2 is guided.

The second housing part 16 is formed in the manner of a cover and has along its longitudinal sides snap projections 20 which correspond to the snap recesses 19.

At its end on the connection end side, the second housing part has engagement elements 21 by which the free end of the first connection end 5 is enclosed.

Second housing part 16' is likewise formed in the manner of a cover with snap projections 20 but has a shorter length than second housing part 16.

The free end of the engagement element 21 of the second housing part 16 and the end of second housing part 16' on the connection end side both abut one another in the assembled condition such that their separating line intersects the first connection opening 11 of the first connection end 5 in the center. These two parts have at these abutting ends, respectively, one half of a first hole 22 that extends coaxial to the first connection opening 11 and whose size corresponds to the first connection opening 11.

When plugged together, the first housing part 15 and second housing parts 16, 16' form the first housing 13 with a rectangular cross section.

The second housing 14 is likewise formed of two identical opposing first housing parts 23 and two opposing second housing parts 24, 24'.

The first housing parts 23 of the second housing 14 are formed as open boxes and have at their mutually facing inner sides supporting webs 17' arranged so as to be spaced apart from one another and transverse to the longitudinal extension. The front sides of the supporting webs 17' conform to the contour of the second connection stud 8 and to the contour of the second ball socket 10 when the second housing 14 is assembled.

The first housing parts 23 half enclose the side of the second connection end 8 remote of the cylinder by their first front walls 26.

The first housing parts 23 likewise half enclose the side of the second connection end 8 near the piston rod by their second front walls 27.

The ends of the two second front walls 27 of the first housing parts 23 abut one another in the assembled condition such that their separating line intersects the piston rod 2 in the center. These two parts have at these abutting ends, respectively, one half of a through-opening 28 through which the piston rod 2 is guided.

A plurality of snap recesses 19 are formed at the two side walls 25 of the first housing parts 23 and are spaced apart from one another in longitudinal extension thereof.

The second housing part 24 is formed in the manner of a cover and has along its longitudinal sides snap projections 20, which correspond to the snap recesses 19.

The second housing part 24' is likewise formed in the manner of a cover with snap projections 20 and has along its longitudinal sides snap projections 20, which correspond to the snap recesses 19.

Further, a second hole 29 is formed in the second housing part 24'. This second hole 29 extends coaxial to the second connection opening 12 and its size corresponds to the second connection opening 12.

When plugged together, the first housing part 23 and second housing parts 23, 24, 24' form the second housing 14 with a rectangular cross section.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston piston-cylinder unit comprising:
a cylinder, the interior of the cylinder being divided into two working chambers by a displaceable piston, a piston rod being arranged at the displaceable piston and guided outward in a sealed manner through one of the working chambers, a first connection end is arranged at an end of the cylinder opposite the piston rod and a second connection end arranged at a free end of the piston rod;
a first housing configured to enclose the cylinder and the first connection end, the first housing being fastened by its one end region to the first connection end of the cylinder and having a second end region having a through opening for the piston rod; and
a second housing configured to enclose the second connection end and fastened to the second connection end, the second housing having an end region having a second through opening for the piston rod,
wherein the first and second housings do not overlap.

2. The piston-cylinder unit according to claim 1, wherein the at least one of the first housing is connected to the first connection end and the second housing is fastened to the second connection end by positive engagement.

3. The piston-cylinder unit according to claim 2, wherein the first connection end is enclosed by the first housing while leaving a first connection opening and the second connection end is enclosed by the second housing while leaving a second connection opening.

4. The piston-cylinder unit according to claim 1, wherein the at least one of the first housing and the second housing is each formed from a plurality of housing parts, and the respective housing parts of the first housing are connected to one another by respective connection elements, and the respective housing parts of the second housing are connected to one another by respective connection elements.

5. The piston-cylinder unit according to claim 4, wherein the connection elements are snap elements arranged at one or more first housing parts that are configured to be snapped into corresponding snap recesses at one or more second housing parts.

6. The piston-cylinder unit according to claim 5, wherein two first housing parts and two second housing parts are arranged opposite one another.

7. The piston-cylinder unit according to claim 4, wherein supporting webs of the one or more of the first housing parts and second housing parts protrude to face the cylinder, face the first connection end, and face the second connection end.

8. The piston-cylinder unit according to claim 1, wherein:
the first housing has a first wall that engages around a front wall of the cylinder perpendicular to the piston rod and on the piston rod side to leave the through-opening for the piston rod and
the second housing has a second wall that engages around a front wall of the second connection end perpendicular to the piston rod and facing the cylinder to leave the second through-opening for the piston rod,
wherein the first wall is axially offset from the second wall along the piston rod so that the first and second housings do not overlap.

* * * * *